Sept. 9, 1924.

A. PARTZSCH

VACUUM GAUGE

Filed March 24, 1923

Inventor:
Arthur Partzsch,
by *Alexander D. Lunt*
His Attorney.

Patented Sept. 9, 1924.

1,508,242

UNITED STATES PATENT OFFICE.

ARTHUR PARTZSCH, OF BERLIN, GERMANY, ASSIGNOR TO GENERAL ELECTRIC COMPANY, A CORPORATION OF NEW YORK.

VACUUM GAUGE.

Application filed March 24, 1923. Serial No. 627,488.

*To all whom it may concern:*

Be it known that I, ARTHUR PARTZSCH, a citizen of the Republic of Germany, residing at Berlin, Germany, have invented certain new and useful Improvements in Vacuum Gauges, of which the following is a specification.

My invention relates to vacuum gauges and more in particular to an improvement in the MacLeod type of vacuum gauge, and its object is to provide a durable and practical form of this type of gauge.

In the known type of MacLeod gauge the greater part of the instrument is made of glass in order that mercury columns in adjacent tubes may be observed and compared relative to a graduated scale. Such an instrument must be handled with considerable care due to the fragility of the material of which it is constructed. My improvement relates to an arrangement whereby the greater portion of the instrument may be made of metal, such as iron and which therefore is a much more durable and practical form of instrument.

The features of my invention which I believe to be novel and patentable will be pointed out in the claims appended hereto. The construction of my improved gauge and its comparison with the known type of MacLeod gauge will now be explained in connection with the accompanying drawing in which Fig. 1 represents the MacLeod gauge as previously constructed, Fig. 2 represents the preferred form of my improved vacuum gauge and Figs. 3 and 4 modifications thereof.

Figure 1:
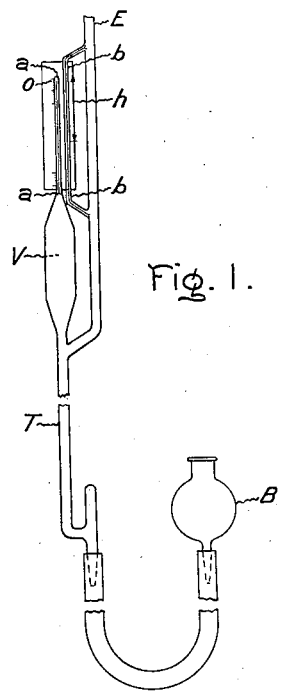
Figure 2:
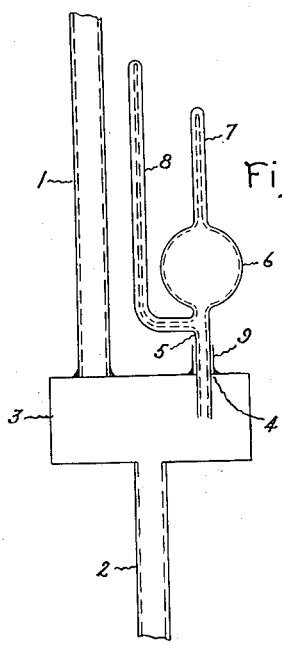

In Fig. 1, I have represented a well known form of the MacLeod vacuum meter or gauge. The principle of this gauge consists in compressing a given volume V of the gas whose pressure P is to be measured, to a much smaller volume $v$ and observing the resultant pressure $p$ which in accordance with Boyle's law is given by the relation $$p = P\frac{V}{v}.$$

Referring to Fig. 1 the bulb V, to which is attached a capillary tube $aa$ is connected to the low pressure system E and also to the barometric column T. In order to avoid errors due to the effect of capillarity, a comparing tube $bb$ of the same diameter as $aa$ is sealed on as a by-path to the large tube E. To operate the gauge the reservoir B is raised, thus forcing the mercury in the barometric column upward until the gas in V is shut off from the remainder of the system. As the mercury is raised further, the volume of gas V is compressed until finally the mercury in the capillary $bb$ is level with the upper end of the capillary $aa$ (corresponding to the point O on the scale). The pressure on the gas in the capillary is then evidently equal to that of the mercury column of height $h$, $h$ being the length of the gas column in capillary $aa$ under these conditions. Now if $a$ denotes the volume of the capillary per unit length, and P denotes the pressure in the system E, then it follows from Boyle's law that $$P = \frac{a}{v}h^2.$$

It will be noted that practically the entire gauge is made of glass and consequently must be used and handled with considerable care. It would not be feasible to make the two transparent capillary tubes of glass and the remainder of metal such as iron because of the difficulty of branching a glass tube off from an iron tube at two points and making connections which would remain tight under all conditions of expansions and contractions. In order to avoid the difficulties and provide a gauge which is more durable in its construction I make my improved gauge in the form shown in Figs. 2, 3 and 4, where the tube 1 leading to the low pressure system and the barometric column 2 are made of metal integral with an intermediate metal chamber or elbow 3.

In Fig. 2 the chamber 3 is provided with an opening 4 on its upper side in which is inserted a glass tube 5. The tube 5 is branched to form the bulb 6 with its capillary 7 and a comparing capillary 8. The connection between tube 5 and chamber 3 is made tight such as by a gasket inserted between the tube 5 and a flange 9 extending upward from the chamber 3. This connection involves no particular difficulty because the upper extremity of the glass vessel is free to expand and contract unequally with the tube 1. During transportation and when the gauge is not being used the glass portion of the gauge may be removed and a cork inserted in opening 4, thereby eliminating the liability of breaking to a minimum.

This gauge is used in the same manner as the gauge shown in Fig. 1. With my improved instrument a very small error in the measurement occurs by reason of the fact that the pressure, above the mercury in the comparing tube 8, is slightly higher than the pressure in tube 1, which is to be measured. However, the increase in pressure in tube 8, due to the rise of the mercury therein after it is shut off from the remainder of the system, is so small that for all practical measurements the error may be disregarded. The reason why this error is so small is that the volume of tube 8 is very small as compared with the volume of bulb 6 and further by reason of the fact that the tube 8 extends some distance beyond the upper level of tube 7 and the error may be decreased still further by enlarging tube 8 above the upper level of tube 7. Where, for special reasons, this error must be taken into consideration it can readily be ascertained with exactness and allowance made therefor.

Figure 3:
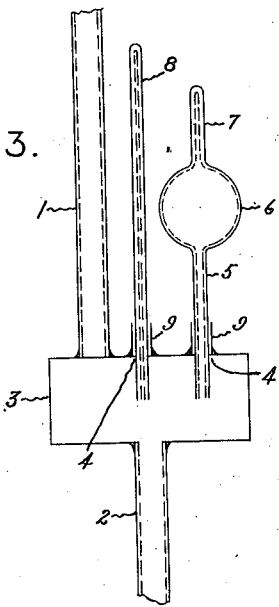
Figure 4:
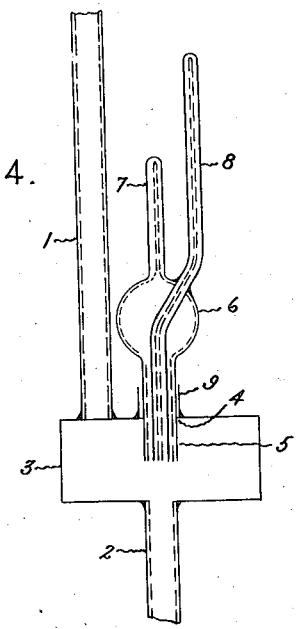

In Fig. 3 the tube 8 is made separate from tube 5 and is separately seated on chamber 3. In Fig. 4 tube 8 is sealed thru the wall of bulb 6 and passes to the chamber 3 thru tube 5 which is enlarged for this purpose. Except for the difference in construction the explanation of Fig. 2 applies to Figs. 3 and 4.

I do not wish to be limited to the exact construction herein described but seek to cover, in the appended claims, all modifications which come within the true spirit and scope of my invention.

What I claim as new and desire to secure by Letters Patent of the United States, is:

1. A vacuum gauge comprising an upright metal conduit provided with an opening at an intermediate point therein, a closed glass vessel communicating with and extending above said opening, said glass vessel comprising a volume bulb, a capillary measuring tube extending upwardly from the bulb and tube extending upwardly from the bulb and a capillary comparing tube communicating with said vessel below said volume bulb and extending above said capillary measuring tube.

2. A vacuum gauge of the MacLeod type having the pressure and barometric tubes thereof made of metal and the volume bulb, measuring capillary tube and comparing capillary tube thereof made of glass, said comparing tube being closed at its upper end and communicating with said pressure tube only at its lower end.

3. A vacuum gauge of the MacLeod type made of two integral structures, one a metallic structure comprising the pressure and barometric tubes and the other a glass vessel comprising the volume bulb, the capillary measuring tube and the capillary comparing tube, said last mentioned tube being closed at its upper end, said metallic structure being provided with an opening between said pressure and barometric tubes, and said glass vessel being provided with an opening at its lower end, and means for removably securing said structures together with said openings in communication.

In witness whereof, I have hereunto set my hand this 23rd day of February, 1923.

ARTHUR PARTZSCH.